(12) United States Patent
Merboth et al.

(10) Patent No.: US 7,715,861 B2
(45) Date of Patent: May 11, 2010

(54) METHOD AND APPARATUS FOR REDUCING PACKET ASSISTANT CHANNEL POWER USAGE

(75) Inventors: Lawrence J. Merboth, Bridgewater, NJ (US); Subramanian Vasudevan, Morristown, NJ (US); Stanley Vitebsky, Morristown, NJ (US); Henry Hui Ye, Ledgewood, NJ (US); Lily H. Zhu, Parsippany, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 967 days.

(21) Appl. No.: 11/230,153

(22) Filed: Sep. 19, 2005

(65) Prior Publication Data

US 2007/0066336 A1 Mar. 22, 2007

(51) Int. Cl.
*H04W 52/34* (2009.01)

(52) U.S. Cl. .................... 455/522; 455/561; 455/67.11; 455/127.1; 370/328

(58) Field of Classification Search ................. None
See application file for complete search history.

(56) References Cited

U.S. PATENT DOCUMENTS

| | | | |
|---|---|---|---|
| 6,618,598 | B1 | 9/2003 | Gandhi et al. |
| 6,662,019 | B2 | 12/2003 | Kamel et al. |
| 6,842,441 | B2 | 1/2005 | Balogh et al. |
| 6,859,446 | B1 | 2/2005 | Gopalakrishnan et al. |
| 6,925,057 | B2 | 8/2005 | Cheng et al. |
| 2003/0108026 | A1* | 6/2003 | Jyrkka et al. ............ 455/522 X |
| 2003/0223429 | A1 | 12/2003 | Bi et al. |
| 2004/0203822 | A1 | 10/2004 | Vitebsky |
| 2005/0164730 | A1* | 7/2005 | Chen et al. ................. 455/522 |

* cited by examiner

*Primary Examiner*—Philip J Sobutka
(74) *Attorney, Agent, or Firm*—Fletcher Yoder

(57) ABSTRACT

There is provided a method and apparatus for reducing packet assistant channel power usage in a wireless telephone system. More specifically, there is provided a method comprising measuring a power usage for a packet assistant channel, determining whether the power usage is above a threshold, and discontinuing transmission over the packet assistant channel for a period of time if the power usage is above the threshold.

19 Claims, 3 Drawing Sheets

METHOD AND APPARATUS FOR REDUCING PACKET ASSISTANT CHANNEL POWER USAGE

BACKGROUND OF THE INVENTION

1. Field of the Invention

The present invention relates generally to communications and, more particularly, to wireless communications.

2. Description of the Related Art

This section is intended to introduce the reader to various aspects of art that may be related to various aspects of the present invention, which are described and claimed below. This discussion is believed to be helpful in providing the reader with background information to facilitate a better understanding of the various aspects of the present invention. Accordingly, it should be understood that these statements are to be read in this light, and not as admissions of prior art.

One of the paramount challenges facing modern wireless telephone systems is the rapid growth of consumer demand for data services such as Internet access, text messaging, and e-mail. In fact, consumers are demanding greater access to data-related services than ever before, and this trend is not likely to change. For example, in the coming years, consumers will likely expect their wireless telephones to provide many, if not all, of the digital data communication features currently provided by computers (e.g., video conferencing, picture mail, etc.).

One method of transmitting digital data, such as digital photos, web pages, or videos, is with packets. A packet is a package of data capable of being routed through a computer network. Packets typically contain a packet header that contains the destination for the data, a payload that contains the data being transmitted, and some form of error checking information. Typically, a transmitting device will divide a message or file into a plurality of packets that will be transmitted across the network to a receiving device. The receiving device will then reassemble the packets into the original message or file. If one or more of the packets does not arrive at the receiver or arrives and cannot be decoded, the receiver can request a replacement packet from the transmitter. In this way, packetizing data may permit more efficient transmission of data by limiting the amount of data resent as a result of an error.

For the reasons stated above, packetizing data is a logical choice for transmitting data to a wireless unit or device. Over the past few years, a variety of systems have been developed to transmit packetized data over the cellular telephone network. These system include, but are not limited to, 1x Evolution Voice-Data Voice ("1x EV-DV") in 3G1x, Evolution Voice-Data Only ("EV-DO"), and High Speed Downlink Packet Access ("HSDPA") of Universal Mobile Telecommunication System ("UMTS"). Although the specific implementation details of each of these systems may vary, each adds at least one additional channel to carry packetized data. For example, 1x EV-DV includes a forward packet data channel ("F-PDCH") to carry packetized data across a forward link between a base station and a wireless device.

In addition to packet data channels, packetized data transmission systems also typically include one or more control channels, referred to as packet assistant channels, to carry information that may facilitate or improve the transmission of data over the packet data channels. For example, 1x EV-DV includes a forward common power control channel ("F-RCCH") that carries power commands to the mobile devices, a forward rate control channel ("F-RCCH") that carries rate control information for the mobile device, a forward acknowledgement channel ("F-ACK") that carries acknowledgement feedback for a reverse packet data channel, and a forward grant channel ("F-GCH") that carries resource assignments associated with the reverse packet data channel.

Although the packet assistant channels facilitate the transmission of packetized data across the forward link, the data transmitted over the packet assistant channels still consumes base station transmission power. In fact, the packet assistant channels in combination with overhead channels, such as the pilot, paging, and sync channels may consume fifty percent or more of the base station's available transmission power in a 3G1x system, for example. Reducing the transmission power usage of the assistant channels may permit more of the base station's transmission power to be used to transmit the actual packetized data, which can increase the amount of digital data that can be transmitted to mobile devices. In the case of mixed voice and data on the same channel, reducing assistant channel power may also permit more of the base station's transmission power for voice calls.

SUMMARY OF THE INVENTION

Certain aspects commensurate in scope with the disclosed embodiments are set forth below. It should be understood that these aspects are presented merely to provide the reader with a brief summary of certain forms the invention might take and that these aspects are not intended to limit the scope of the invention. Indeed, the invention may encompass a variety of aspects that may not be set forth below.

In one embodiment, a method is provided for reducing packet assistant channel power usage. More specifically, an exemplary method provides for measuring a power usage for a packet assistant channel, determining whether the power usage is above a threshold, and discontinuing transmission over the packet assistant channel for a period of time if the power usage is above the threshold.

BRIEF DESCRIPTION OF THE DRAWINGS

Advantages of the invention may become apparent upon reading the following detailed description and upon reference to the drawings in which.

DETAILED DESCRIPTION OF SPECIFIC EMBODIMENTS

One or more specific embodiments of the present invention will be described below. In an effort to provide a concise description of these embodiments, not all features of an actual implementation are described in the specification. It should be appreciated that in the development of any such actual implementation, as in any engineering or design project, numerous implementation-specific decisions should be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The embodiments described herein are directed towards a system or a method for reducing packet assistant channel power usage. Specifically, in one embodiment, a base station may periodically measure the power usage of one or more of the packet assistant channels and may discontinue transmission across the one or more packet assistant channels for an amount of time if the power usage of the assistant channel exceeds a threshold.

Figure 1:
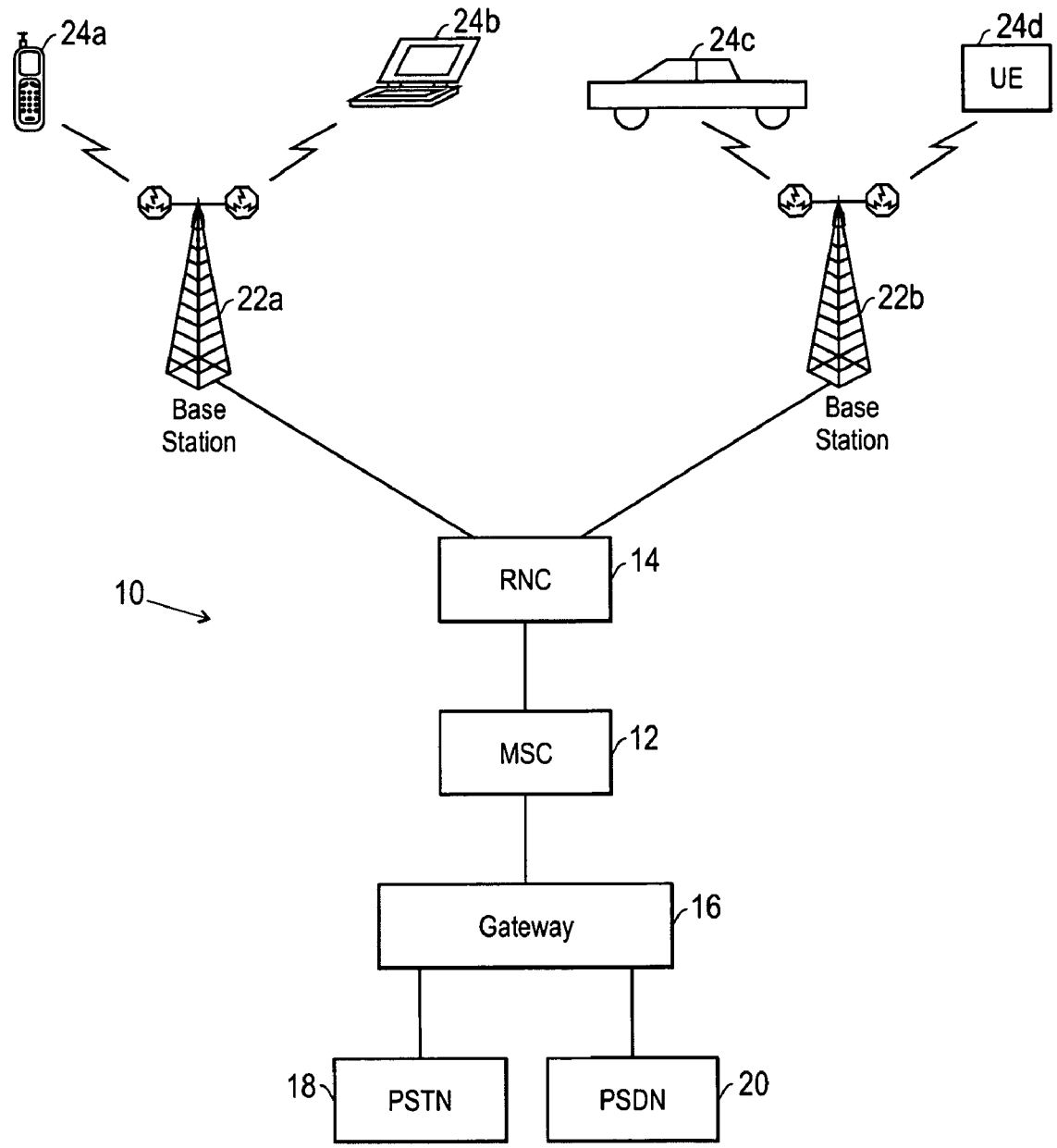
FIG. 1 illustrates a block diagram of an exemplary wireless telephone system in accordance with an embodiment of the present invention.

Turning now to the drawings, and referring initially to FIG. 1, a block diagram of an exemplary wireless telephone system is illustrated and generally designated by a reference numeral 10. Those of ordinary skill in the art will appreciate that the wireless telephone system 10, described below, illustrates merely one embodiment of a system configured to manage supplemental channels in a wireless telephone system, such as a 1× EV-DV. As such, those of ordinary skill in the art will appreciate that the techniques described herein may be employed in a wide variety of wireless telephone systems including, but not limited to CDMA2000 3G-1×, EV-DO, CDMA2000 3×, WCDMA, and HSDPA. Moreover, it will also be appreciated that while the embodiment described below involves transmission from a base station to a mobile device (i.e., the forward link), with slight modifications, the techniques described herein could also be employed for communication over the reverse link (i.e., from the mobile device to the base station).

In any given wireless telephone market, such as a typical metropolitan area, the wireless telephone system 10 may include at least one mobile switching center ("MSC") 12. The MSC 12 is a switch that serves the wireless telephone system 10. The primary purpose of the MSC 12 is to provide a voice path and/or a data path between a mobile device and another telephone or data source. The typical MSC 12 includes a number of devices, such as computerized call routers, that control switching functions, call processing, channel assignments, data interfaces, tracking, paging, call handoff, and user billing. The MSC 12 may be coupled to a gateway 16, which in turn may be coupled to a public switched telephone network ("PSTN") 18, which is often referred to as a land line telephone network. The wireless telephone system 10 typically includes a connection to the PSTN 18, because a majority of all wireless telephone calls pass through the PSTN 18. The gateway 16 may also be coupled to a packet switch data network ("PSDN") 20, such as the Internet, so as to provide Internet service to wireless telephone users.

One or more radio network controllers ("RNC") 14 may also be coupled to the MSC 12. The RNC 14 may control the use and reliability of radio resources within the wireless telephone system 10. Specifically, the RNC 14 may control the allocation and release of specific radio resources to establish a connection between mobile devices (see below) and the MSC 12.

The RNC 14 may be communicatively coupled either by wire or wirelessly to one or more base stations 22a and 22b. The base stations 22a and 22b are transmission and reception stations that act as access points for network traffic from a variety of mobile devices 24a, 24b, 24c, and 24d. As such, the base stations 22a and 22b may communicate voice or data with any suitable mobile device, such as a portable wireless telephone 24a, a laptop computer 24b, a vehicle system 24c, or other user equipment 24d. While only two base stations 22a and 22b are illustrated in FIG. 1, those of ordinary skill in the art will appreciate that any suitable number of base stations 22a and 22b may be coupled to the RNC 14.

Figure 2:
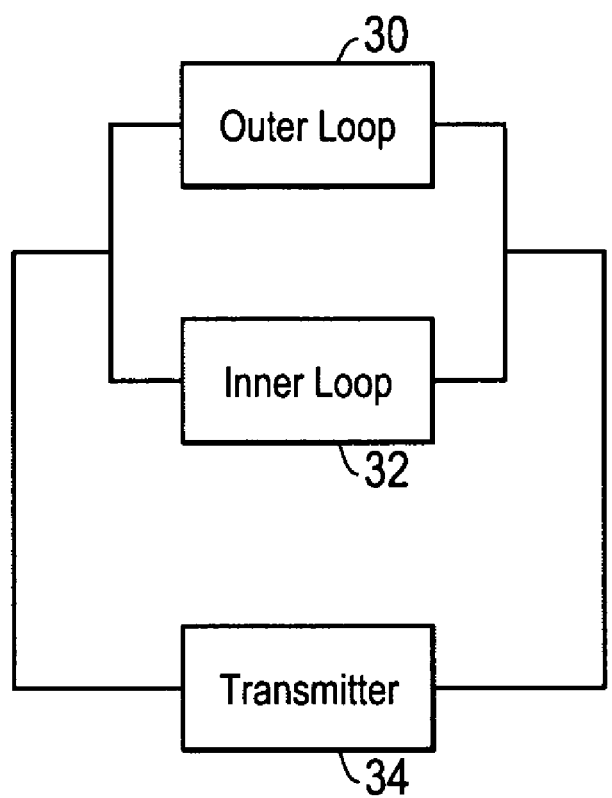
FIG. 2 illustrates a block diagram of an exemplary base station in accordance with embodiments of the present invention.

As described above, the base stations 22a and 22b may transmit packetized data to the mobile devices 24a, 24b, 24c, and 24d. FIG. 2 illustrates a block diagram of an exemplary base station, 22a and 22b in accordance with one embodiment. As illustrated in FIG. 2, the base station 22a,b may be represented as an outer loop 30, an inner loop 32, and a transmitter 34. The outer loop 30, the inner loop 32, and the transmitter 34 may be hardware, software, firmware, or some combination of hardware, software, and firmware. Additionally, the outer loop 30, the inner loop 32, and the transmitter 34 shown in FIG. 2 are merely one example and other examples can be envisaged wherein the base station's functions are distributed differently. For example, in one alternate embodiment, the outer loop 30, the inner loop 32, and the transmitter 34 may be consolidated or rearranged within a transceiver capable of both receiving and transmitting wireless signals.

As illustrated in FIG. 2, the base stations 22a and 22b may include an outer loop 30. The outer loop 30 may be configured to measure power usage of packet data assistant channels in the base station 22a and 22b and to enable an inner loop 32 to discontinue transmission across one or more packet assistant channels if the power usage in the base station 22a and 22b exceeds a threshold. For example, the inner loop may discontinue transmission if the power usage of assistant channel exceeds 15% of the total transmit power (e.g., 3 watts for a 20 watt amplifier). In one embodiment, the outer loop 30 is a computer system running base station application software. In alternate embodiments, the outer loop 30 may be an application specific integrated circuit ("ASIC"), a field programmable gate array ("FPGA"), a processor, such as a digital signal processor ("DSP"), or another suitable processing or computing component.

The outer loop 30 may be communicatively coupled to the inner loop 32. As will be described in greater detail below, the inner loop 32 may be configured to measure periodically the power usage of one or more packet assistant channels and to report this measured power usage to the inner loop 30. Further, if the outer loop 30 enables packet assistant channels to be discontinued (see above) by the inner loop 32 may be configured to discontinue transmission across the packet assistant channels for a length of time if the power usage in the base station meets a certain threshold and/or if the data being transmitted across one or more of the packet assistant channels qualifies to be discontinued. In one embodiment, the inner loop 32 is an ASIC. In alternate embodiments, however, the inner loop 32 may be an FPGA, a processor such as a DSP, a computer or other processor executing application software, and so forth.

Moreover, as shown in FIG. 2, the base station 22a, b may also include a transmitter 34. In one embodiment, the transmitter 34 is communicatively coupled to the outer loop 30 and the inner loop 32, and configured to transmit data to the mobile devices 24a, 24b, 24c, and 24d over one or more channels. In one embodiment, the inner loop 32 may transmit a signal to the transmitter 34 instructing the transmitter 34 to discontinue transmission of signals across packet assistant channels that have been identified as discontinuable.

Figure 3:
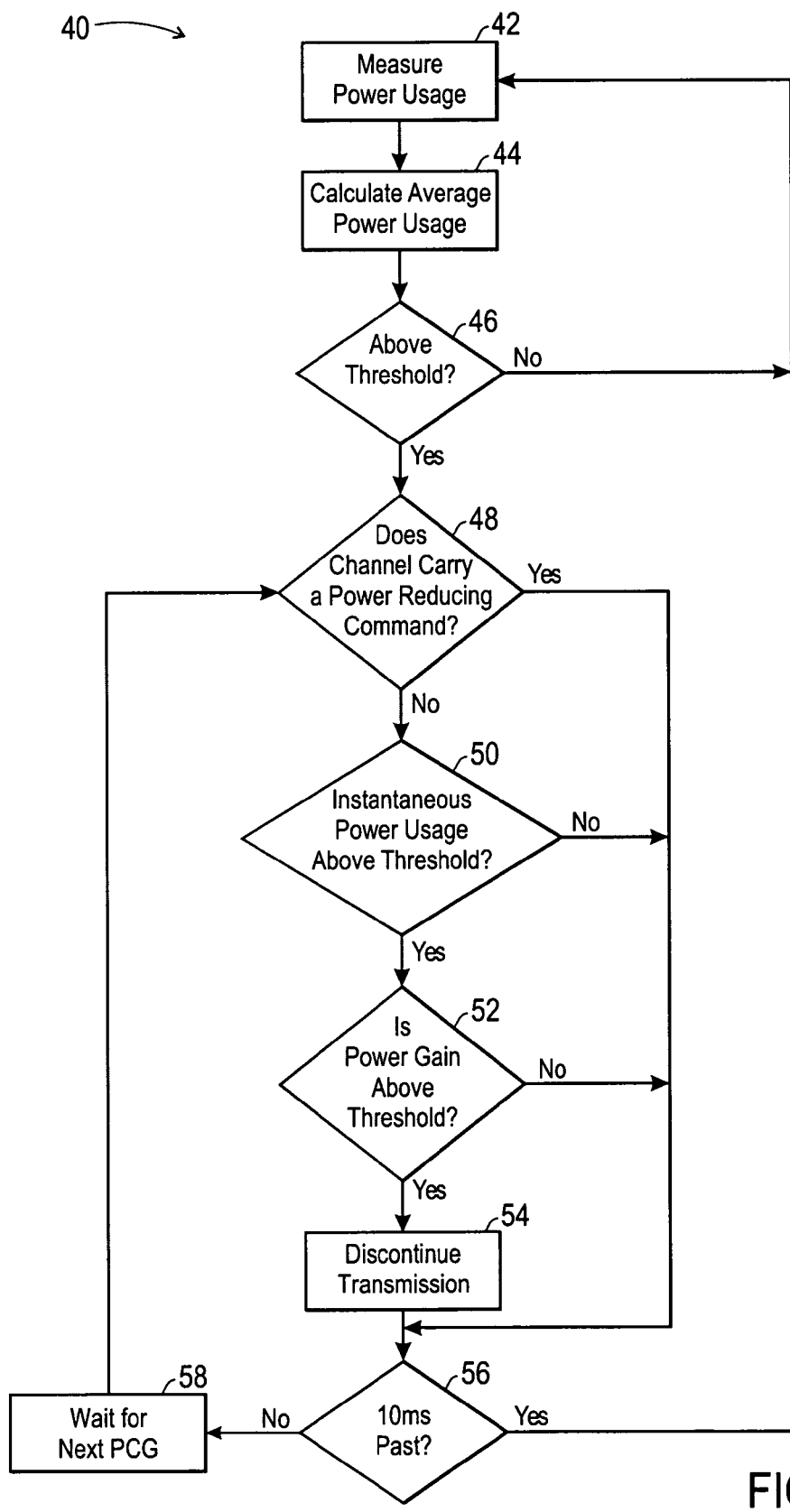
FIG. 3 is a flow chart illustrating an exemplary technique for reducing packet assistant channel power usage in accordance with an embodiment of the present invention.

As described above, the base station 22a, b can be configured to discontinue transmission of data over one or more packet assistant channels if the power usage of the base station 22a and 22b exceeds a threshold. FIG. 3 is a flowchart illustrating an exemplary technique 40 for reducing packet assistant channel power usage in accordance with one embodiment. As will be described below, the base station 22a and 22b may execute the technique 40 to reduce packet assistant channel power usage. As illustrated in FIG. 3, the technique 40 begins with the inner loop 32 measuring power usage of one or more packet assistant channels, as indicated in block 42. In one embodiment, the inner loop 32 measures the power usage of a forward rate control channel ("F-RCCH"), a forward acknowledgment channel ("F-ACK"), and/or a forward grant channel ("F-GCH"). In alternate embodiments, the inner loop 32 measures the power usage of other suitable packet assistant channels or control channels.

Once the inner loop 32 has measured the power usage, it may forward this power usage information to the outer loop 30 which may calculate an average power usage for one or more of the packet assistant channels, as indicated by block 44. In one embodiment, the outer loop 30 calculates the average power usage over some number of previous frames or over a previous time period. For example, the outer loop 30 may calculate the average power usage over the past one second or may calculate the average power usage over the previous twenty frames. In one embodiment, the outer loop 30 may employ an infinite impulse response filter ("IIR") that is updated every frame with a time constant of 1/20. In alternate embodiments, calculating the average power usage involves calculating a running average of the power usage or performing other mathematical functions on historical power usage information for the base station 22a and 22b.

Once the outer loop 30 has calculated the average power usage for the packet assistant channels, the outer loop 30 may determine whether the average power usage exceeds a power usage threshold, as indicated in block 46. If the average power usage does not exceed the power usage threshold, the base station 22a, b may loop back to the beginning of the technique 40, as illustrated in FIG. 3. For example, if the total power usage for the packet assistant channels is less than 20 percent of the base stations 22a or 22b total transmit power, the outer loop 30 may wait an amount of time (e.g., 10 milliseconds) and then loop back to the beginning of the technique 40.

If, however, the average power usage exceeds the threshold, the outer loop 30 may enable the inner loop 32 to discontinue transmission over one or more of the packet assistant channels. As indicated in block 48, the inner loop may first determine whether the packet assistant channels of interest (i.e., the packet assistant channels that were measured or the packet assistant channels that may be discontinued) carry reverse link power/rate reduction commands for one of the mobile devices 24a, 24b, 24c, or 34d. Because the reverse link power/rate reduction commands benefit the overall reverse link interference level in the cellular system 10 (e.g., the base station is sending down commands because its reverse link is overloaded), it may not be advantageous to discontinue transmission data over channels that carry power/rate reducing commands to the mobile devices 24a, 24b, 24c, and 24d. As such, the transmission of power reduction commands may be one a plurality of mitigation factors that may indicate that it is not advantageous to discontinue transmission across one of the packet assistant channels.

For example, in a 1× EV-DV system, the F-RCCH channel carries instructions for the mobile devices 24a, 24b, 24c, or 24d either to increase or decrease their transmission rate with the base station 22a, 22b. If the F-RCCH carries a command to decrease the transmission rate, discontinuing this instruction may cause the mobile device 24a to continue to transmit at a higher transmission rate, which could actually use more power than transmitting a lower rate. As such, it may not be beneficial to discontinue transmission over the F-RCCH channel if it this channel is carrying an instruction to decrease the data rate of one of the mobile devices 24a, 24b, 24c, or 24d. On the other hand, if the F-RCCH channel is carrying an instruction for the mobile device 24a to increase its data rate, it does not adversely affect the base station 22a, b to discontinue transmission across the F-RCCH. Even though the particular mobile device 24a that was intended to benefit from the higher data rate will continue to use a lower data rate until transmissions across the F-RCCH resume, all of the mobile devices 22a, 24b, 24c, and 24d may benefit from reducing the power usage of the F-RCCH.

As indicated by block 48, if the channel or channels being measured carry power-reducing commands, the base station 22a, 22b may proceed to block 56, which is discussed further below. In alternate embodiments, block 48 may be omitted from the technique 40 and the base station 22a or 22b may discontinue transmission across a channel regardless of whether the channel is carrying power reduction commands for one of the mobile devices 24a, 24b, 24c, or 24d.

The inner loop 32 may also determine whether the instantaneous power usage of the channel or channels of interest exceeds an instantaneous power usage threshold, as indicated in the block 50. This step is included in the technique 40 to ensure that the power to one or more of the packet assistant channels exceeds the threshold not only on an average basis (as described above in regard to block 44) but also on a current or instantaneous basis. For example, while the average power usage calculated over the previous one second may exceed the power usage threshold, the current power usage may not. Moreover, as will be described below, the average power usage may be calculated with one frequency even though the inner loop 32 has the capacity to discontinue transmission across one or more of the packet assistant channels with a different frequency. For example, as illustrated in FIG. 3, the average power usage may be calculated every 10 ms while the inner loop 32 may be able to discontinue transmission across one or more of the packet assistant channels in increments of 1.25 ms (i.e., one power controlled group ("PCG") in 1× EV-DV). For these reasons, the inner loop 32 may be configured to verify that the power usage of the channels of interest is currently below the power usage threshold before transmissions across these channels are discontinued. If the instantaneous power usage is not above the threshold, the technique 40 may proceed to block 56, as described below. As such, the instantaneous power may be another mitigating factor that may indicate that it is not advantageous to discontinue transmission across one of the packet assistant channels.

If the instantaneous power usage is above the threshold, the inner loop 32 may next determine whether the power gain from discontinuing one or more of the packet assistant channels exceeds a power gain threshold, as indicated in block 52. In one embodiment, the inner loop 32 may determine whether the power gain is above the threshold for each of a plurality of packet assistant channels. For example, the inner loop 32 may have a one percent power gain threshold. Accordingly, if the power gain from discontinuing transmission across one or more of the packet assistant channels would not result in at least a one percent increase in the power available for transmitting packetized data from the base station 22a, 22b, the inner loop 32 may be configured to not discontinue transmission for that channel and to proceed instead to the block 56 which will be described below. Moreover, in alternate embodiments, the base station 22a, b may change the power gain threshold to account for changes in power usage or channel condition.

If, however, the power gain is above the threshold, the inner loop 32 may transmit an instruction to the transmitter 34 instructing the transmitter 34 to discontinue transmission across one or more of the packet assistant channels for a period of time. In one embodiment, the inner loop 32 may instruct the transmitter 34 to discontinue transmission for one power control group (e.g. 1.25 ms in 1× EV-DV), because the inner loop 32 evaluates the power usage of the assistant channels once every power control group. As such, the gain may yet another mitigating factor that may indicate that it is not advantageous (i.e., there is little or no benefit) to discontinue transmission across one of the packet assistant channels.

As indicated by block 56, once the inner loop 32 has instructed the transmitter to discontinue transmission, it may determine whether 10 ms (i.e. eight power control groups in 1×-EV-DV) has passed since the outer loop 30 last calculated the average power usage, because the base station 22a, b may send information via the assistant packet channels every 10 ms. If 10 ms has passed, the base station 22a or 22b may cycle back to block 42 and repeat the technique 40. If, however, 10 ms has not passed, the inner loop 32 will wait for the start of the next power control group ("PCG"), as indicated in block 58, and repeat blocks 48-56 as described above.

While the invention may be susceptible to various modifications and alternative forms, specific embodiments have been shown by way of example in the drawings and have been described in detail herein. However, it should be understood that the invention is not intended to be limited to the particular forms disclosed Rather, the invention is to cover all modifications, equivalents, and alternatives falling within the spirit and scope of the invention as defined by the following appended claims.

We claim:

1. A method comprising:
   measuring a power usage at a base station for a packet assistant channel, wherein measuring the power usage comprises determining the power used by the packet assistant channel as a percentage or fraction of a total transmit power of the base station;
   determining whether the power usage is above a threshold; and
   discontinuing transmission over the packet assistant channel for a period of time if the power usage is above the threshold.

2. The method, as set forth in claim 1, wherein measuring the power usage comprises measuring the power usage at the start of each of a plurality of power control groups.

3. The method, as set forth in claim 1, wherein measuring the power usage comprises measuring the power usage approximately every eight power control groups.

4. The method, as set forth in claim 1, wherein measuring the power usage comprises measuring the power usage of a forward rate control channel.

5. The method, as set forth in claim 1, wherein measuring the power usage comprises measuring the power usage of a forward acknowledgment channel.

6. The method, as set forth in claim 1, wherein measuring the power usage comprises measuring the power usage of a forward grant channel.

7. A base station comprising:
   a component for measuring a power usage for a packet assistant channel, wherein measuring the power usage comprises determining the power used by the packet assistant channel as a percentage or fraction of a total transmit power of the base station, and wherein the component for measuring is configured to determine whether the power usage is above a threshold; and
   a component for discontinuing transmission over the packet assistant channel for a period of time if the power usage is above the threshold.

8. The base station, as set forth in claim 7, wherein the component for measuring comprises a computer running application software.

9. The base station, as set forth in claim 7, wherein the component for measuring comprises an application specific integrated circuit.

10. The base station, as set forth in claim 7, wherein the component for discontinuing comprises an application specific integrated circuit.

11. The base station, as set forth in claim 7, wherein the component for measuring is configured to measure the power usage of a forward rate control channel.

12. The base station, as set forth in claim 7, wherein the component for measuring is configured to measure the power usage of a forward acknowledgment channel.

13. The base station, as set forth in claim 7, wherein the component for measuring is configured to measure the power usage of a forward grant channel.

14. The base station, as set forth in claim 7, wherein the component for measuring is configured to measure the power usage approximately every eight power control groups.

15. The base station, as set forth in claim 7, wherein the component for measuring is configured to enable the component for discontinuing to discontinue transmission if the power usage is above the threshold.

16. A method comprising:
   measuring a power usage of a packet assistant channel;
   calculating an average power usage for the packet assistant channel over a period of time;
   determining whether the average power usage is above a threshold; and
   if the average power usage is above the threshold:
      determining whether any mitigating factors related to the packet assistant channel exist; and
      discontinuing transmission over the packet assistant channel for a period of time if no mitigating factors are determining to exist.

17. The method, as set forth in claim 16, wherein determining whether any mitigating factors exist comprises determining whether the packet assistant channel carries a power reduction command.

18. The method, as set forth in claim 16, wherein determining whether any mitigating factors exist comprises determining whether the instantaneous power usage of the packet assistant channel is above the threshold.

19. The method, as set forth in claim 16, wherein determining whether any mitigating factors exist comprises determining whether the transmission power gain from discontinuing transmission across the packet assistant channel exceeds a gain threshold.

* * * * *